Nov. 8, 1966  L. MASLOW  3,283,731
SELF-LEVELING DEVICE
Filed March 30, 1965  4 Sheets-Sheet 1
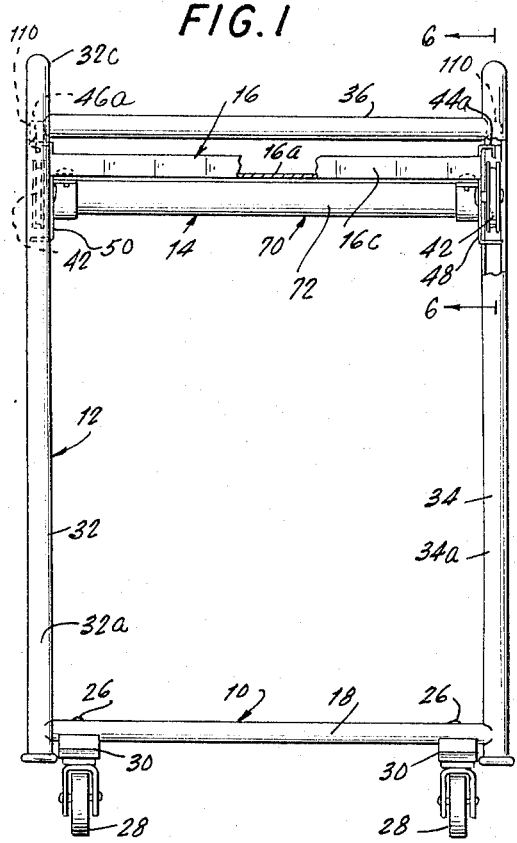
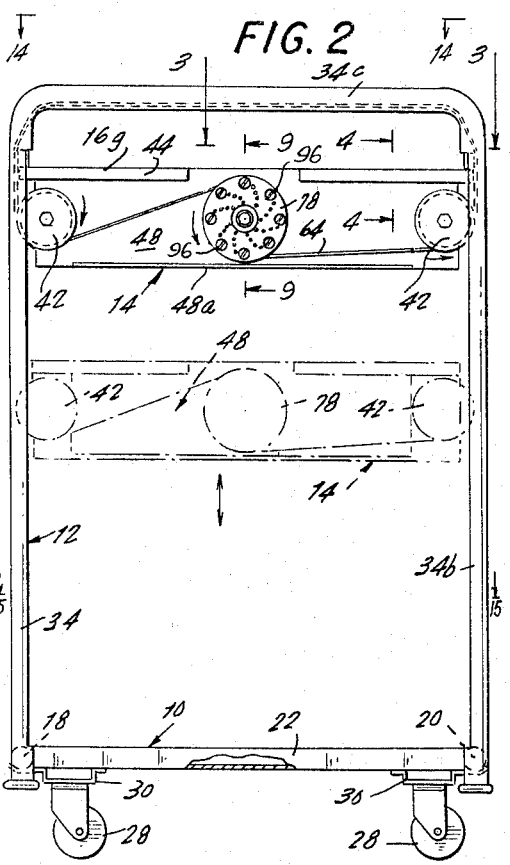
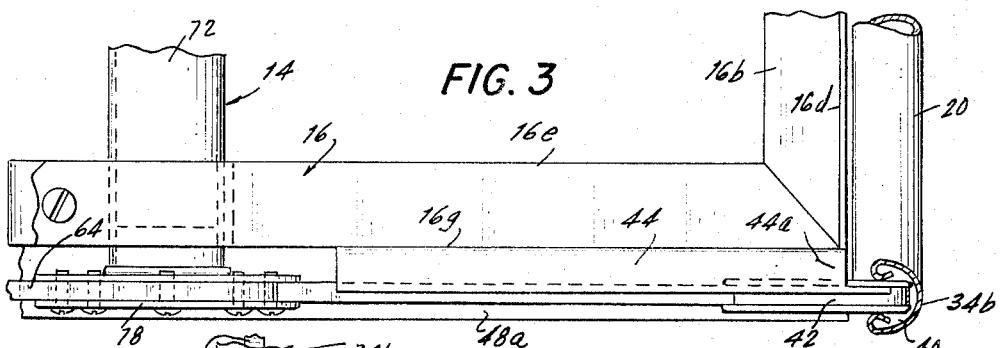
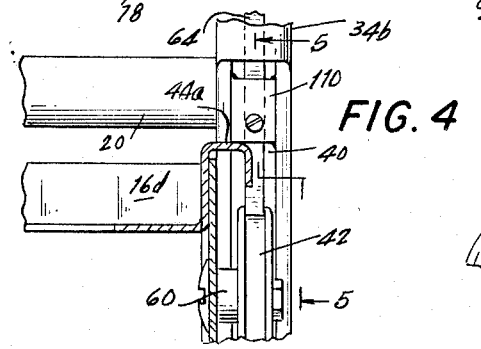
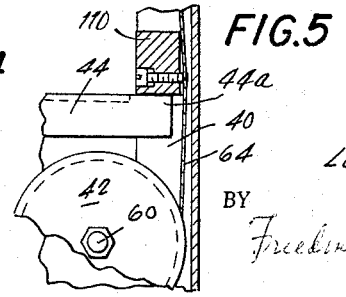
INVENTOR.
LOUIS MASLOW
BY
Friedman & Goodman
ATTORNEYS Nov. 8, 1966   L. MASLOW   3,283,731
SELF-LEVELING DEVICE
Filed March 30, 1965   4 Sheets-Sheet 2
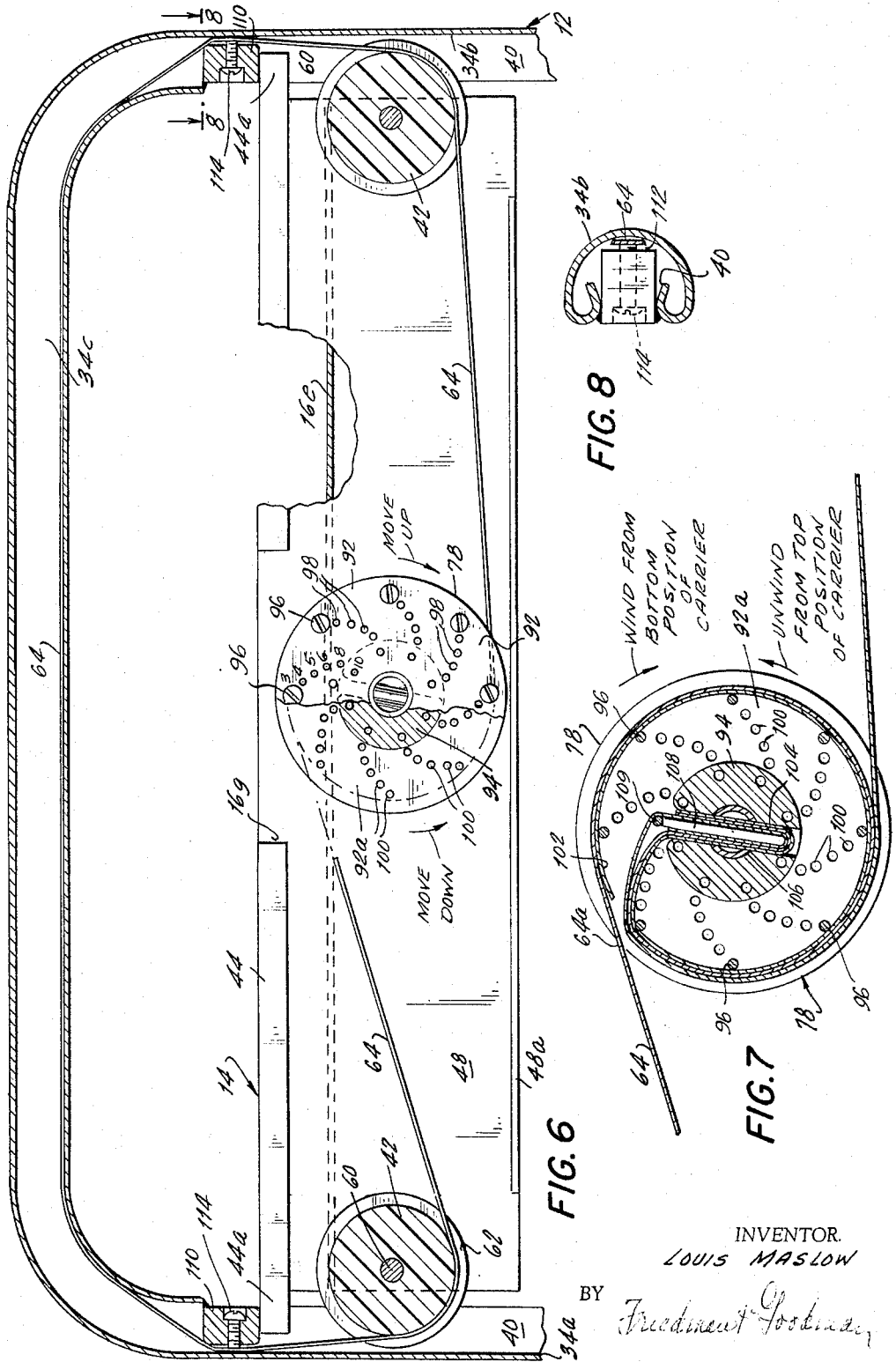
INVENTOR.
LOUIS MASLOW
BY
Friedman & Goodman
ATTORNEYS

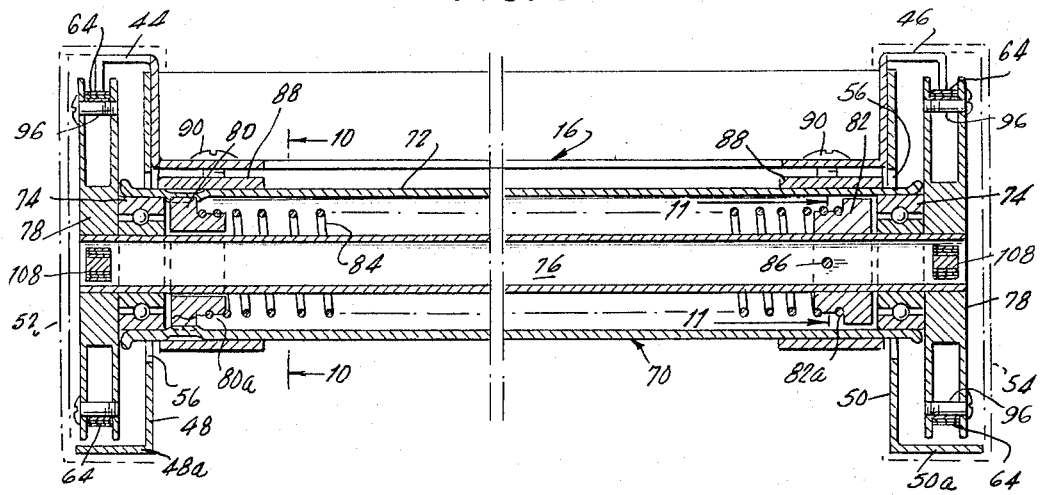
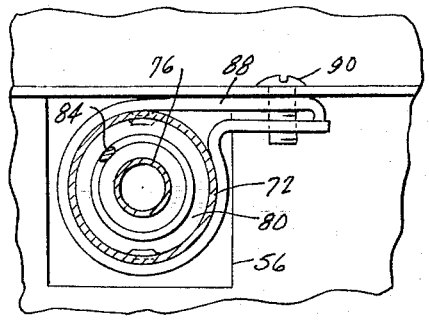
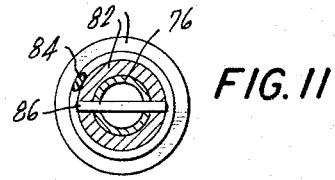
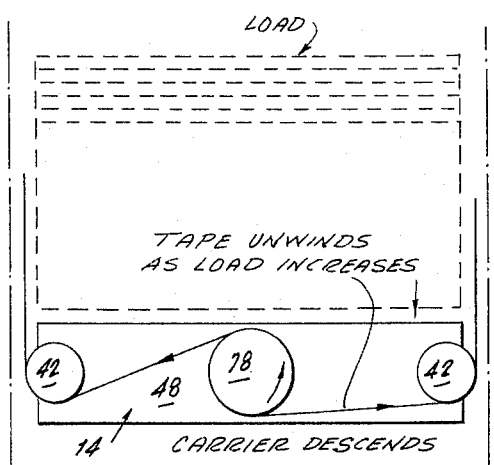
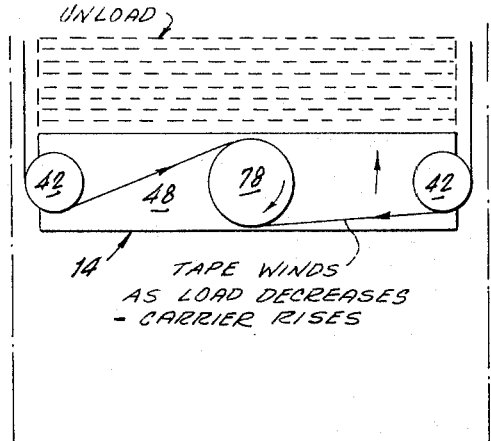

Nov. 8, 1966 — L. MASLOW — 3,283,731
SELF-LEVELING DEVICE
Filed March 30, 1965 — 4 Sheets-Sheet 4

INVENTOR.
LOUIS MASLOW
BY Friedman & Goodman,
ATTORNEYS

United States Patent Office 3,283,731
Patented Nov. 8, 1966

3,283,731
SELF-LEVELING DEVICE
Louis Maslow, Dallas, Pa., assignor to American Machine & Foundry Company, New York, N.Y., a corporation of New Jersey
Filed Mar. 30, 1965, Ser. No. 443,916
12 Claims. (Cl. 108—136)

This invention relates to a self-leveling device for receiving, storing and dispensing articles.

Under many circumstances, it is desirable to dispose a series of articles in stacked relation upon a wheel-mounted carrier and to remove said articles therefrom as desired. Thus, for example, restaurants or similar food service institutions may require that a series of dish racks be stacked as they are removed from a dishwashing machine and thereafter transported to another location at which the racks are unloaded as required. In this, as well as in many other applications, it is quite important that the loading and unloading points be maintained at a constant level regardless of the number of stacked articles disposed upon the carrier in order to minimize the amount of effort required and to maintain the uppermost rack or article at the most desirable level. Although self-leveling devices of this character have been suggested, they have been characterized by shortcomings which are overcome by the instant invention.

It is therefore an object of this invention to provide a self-leveling device for receiving, storing and dispensing articles which is simple in arrangement and construction and which effectively maintains a plurality of articles in stacked relation, with the uppermost article being maintained at a predetermined level regardless of the number of articles comprising the stack.

Another object of this invention is to provide a self-leveling device of the character indicated which may be readily adjusted to accommodate various stacks of articles as when it is desired to change over from a stack comprised of articles of a certain weight and vertical dimension to a stack comprised of articles of a different unit weight and vertical dimension.

It is also an object of this invention to provide a device of the character indicated wherein it is not necessary to employ special types of spring elements in order to provide for the maintenance of a stack of articles at a predetermined constant level regardless of the number of articles comprising the stack and variations in the characteristics of the group.

An additional object of this invention is to provide an arrangement wherein a stack elevating spring is employed and means are provided for adjusting the leverage exerted upon the spring means in accordance with the desired vertical displacement of each article comprising the stack to be supported thereby.

This invention also has for its object the provision of a device of the character indicated wherein positioning means are provided for accurately locating the uppermost article of the stack at a predetermined elevation.

Other and further objects of this invention will become apparent from the description thereof contained in the annexed specification, or will otherwise become obvious. It will be understood that the invention here disclosed may be employed for other purposes to which the structure and arrangement are adapted.

In the accompanying drawings:

FIGURE 1 is a front elevational view of a self-leveling device embodying the features of the instant invention, partly broken away to show the pulley arrangement;

FIGURE 2 is a side elevational view of the self-leveling device wherein the carrier side cover plate has been removed and the carrier is also shown in an intermediate position by means of broken lines;

FIGURE 3 is a fragmentary cross-sectional view taken along line 3—3 of FIGURE 2, the showing being on an enlarged scale;

FIGURE 4 is a fragmentary sectional view taken along 4—4 of FIGURE 2, the showing being on substantially the same scale as FIGURE 3;

FIGURE 5 is a view taken along line 5—5 of FIGURE 4;

FIGURE 6 is a side elevational view of the upper portion of the device on an enlarged scale, the carrier side cover plate being removed and the showing being partly in section and partly broken away;

FIGURE 7 is a sectional view of the tape drum taken in a place transverse of the drum axis;

FIGURE 8 is a cross-sectional view of one of the frame legs taken along line 8—8 of FIGURE 6;

FIGURE 9 is a cross-sectional view of the torque tube assembly;

FIGURE 10 is a view along line 10—10 of FIGURE 9 showing the torque tube clamping arrangement;

FIGURE 11 is a cross-sectional view taken along line 11—11 of FIGURE 9 showing the spring anchoring arrangement;

FIGURES 12 and 13 are diagrammatic views showing various positions of the parts of the self-leveling device comprising the instant invention under various conditions of load;

Figure 14:
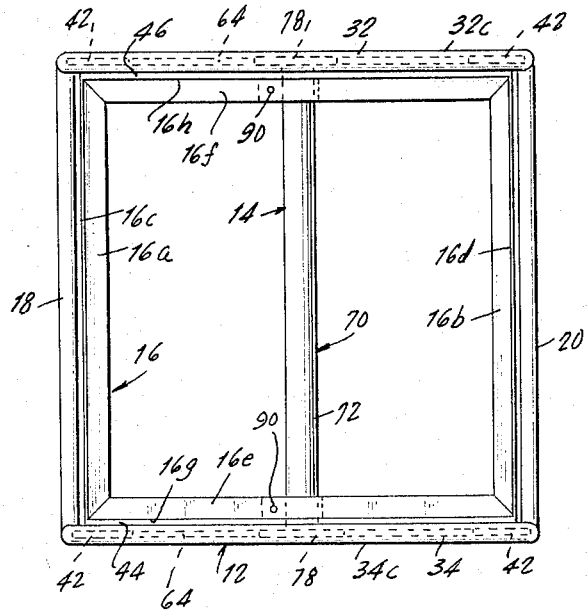
FIGURE 14 is a top plan view of the device comprising the instant invention.
Figure 15:
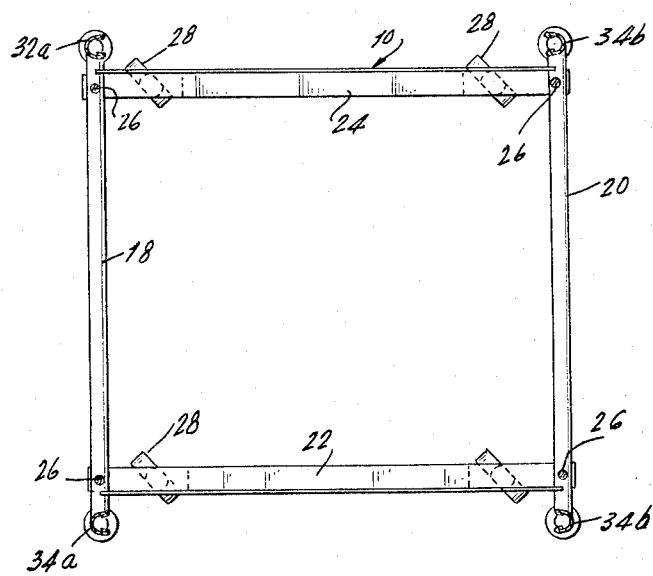
FIGURE 15 is a cross-sectional view taken along line 15—15 of FIGURE 2 showing the bottom frame arrangement.

A self-leveling, receiving, storing and dispensing device embodying the features of the instant invention is illustrated in FIGURES 1, 2, 14 and 15 of the accompanying drawings. As may be seen from said figures, the device comprises a wheel-mounted base assembly designated generally by the numeral 10 which supports an upright frame assembly, designated generally by the numeral 12. A carrier assembly designated generally by the numeral 14 is disposed in the well defined by the frame assembly 12 for the purpose of receiving, storing and dispensing desired articles. The carrier assembly is suspended for vertical movement within the said well thus defined and articles, such as dish racks, for example, are stacked upon the carrier platform 16 of the carrier assembly 14. With the placement of each successive rack or tray upon the carrier platform, the carrier is depressed or lowered to such an extent that the uppermost article of the stack is always at the same working level. Conversely, as an article is removed from the stack, the entire remaining stack is elevated so that the next succeeding article, tray or rack is brought up to the working level.

The base assembly 10 comprises a generally rectangular frame which may advantageously be comprised of front and rear tubular members 18 and 20 while the side brace members 22 and 24 may be advantageously formed of angle stock. The base frame members 18, 20, 22 and 24 are suitably joined at the corners as by means of rivets 26. The base assembly 10 is wheel mounted by means of casters 28 secured in spaced relation to the undersurface of side members 22 and 24 as by means of brackets 30.

Mounted upon the base assembly 10 is a vertically disposed upright support frame assembly 12 within which the carrier assembly 14 is disposed for vertical movement, as will hereafter appear in greater detail.

The upright frame assembly 12 is advantageously formed of suitably bent tubular side frame members 32 and 34. Thus the assembly is comprised of a pair of tubular members of generally inverted U shape conformation. Side frame member 32 includes vertically disposed legs 32a and 32b as well as the bight and horizontal connecting member 32c. Similarly, vertical legs 34a and 34b are surmounted by the bight or horizontal connecting member 34c. The upright frame assembly is completed by means of front and rear transverse braces 36 and 38 respectively.

As heretofore indicated, the side frame members 32 and 34 are advantageously formed from hollow tubing which may be of aluminum or stainless steel and is bent to the indicated inverted U configuration. The vertical or leg portions 32a, 32b, 34a and 34b of the side frame members are further provided with slotted portions which define, track or guideway means 40. Guideways 40 extend for a distance just short of the full length of the vertical legs and correspond to the full length of vertical travel intended for the carrier assembly 14. The slot-like track or guideway 40 may be formed in a number of ways. When rolled tubing having butting edges is employed the guideway may advantageously be formed by deflecting material along the meeting edges of the tubing as shown in FIGURE 8. The tubing material along the butting edges is rolled inwardly and looped back upon itself so as to form a pair of inwardly directed rolled beads which define an open slot or guideway in the tubing having smooth inwardly directed arcuate faces. The track may, of course, be formed in any other desired manner with differing degrees of advantage. The guideways 40 are intended to receive and guide the rim portions of idler pulleys 42 forming part of carrier assembly 14 to be hereinafter more particularly described. The lower extremities of the vertical legs are secured to the wheel-mounted base assembly 10 adjacent the corners thereof. It will be apparent from the foregoing that there is thus provided an upright frame assembly which is wheel mounted so as to be readily drawn or moved from place to place. The wheel mounted upright frame assembly defines an open mouth, vertically disposed, rectangular well within which the carrier assembly 14, to be more particularly described, is mounted for reciprocal movement.

The carrier assembly is designated generally by the numeral 14 and includes the carrier platform 16 which is formed of the front and rear angle members as well as a pair of side angle members.

The front and rear angle members comprise inwardly directed horizontal flange portions 16a and 16b from which vertical wall portions 16c and 16d extend upwardly. The side angle members are similarly comprised of inwardly directed horizontal flange portions 16e and 16f from which vertical wall portions 16g and 16h extend upwardly. The angle members thus define a horizontal platform comprised of the horizontal flange portions of the angle members namely portions 16a, 16b, 16e and 16f. The horizontal platform is surrounded by a perimetric wall comprised of the vertical portions 16c, 16d, 16g and 16h. The platform is thus adapted to receive and support rectangular articles such as dish racks, trays or the like. It will be understood however that the platform may be formed in any desired configuration depending upon the type of article or article carrier which are intended to be supported in stacked relation, without departing from the spirit of this invention. The vertical wall portions 16g and 16h of the side angle member are each provided with reversely bent portions which form downwardly directed or inverted U shaped channel portions 44 and 46. Each of the channels is interrupted medially of its length and is provided with end projections as indicated at 44a and at 46a respectively. Side plate assemblies are secured along each side of the carrier platform 16 and include plates 48 and 50 which are secured to the respective wall positions 16d and 16f by suitable means as by welding. Each side plate is also provided with an outwardly directed bottom flange as indicated at 48a and 50a in FIGURE 9. Cover plates, indicated by broken lines in said figure and identified by the numerals 52 and 54, are removably retained by frictional engagement with the upper channel portion and lower flange of each side plate assembly. An aperture 56 is provided in each of the side plates 48 and 50 in order to provide clearance for projecting portions of the torque tube assembly as will more clearly appear hereafter.

Each of the side plate assemblies also includes a pair of idler pulleys 42 which are rotatably mounted adjacent the extremities of the side plates 48 and 50 by means of stud bolts 60 as may be more clearly seen in FIGURES 4 and 5. The arrangement of the side plate assemblies and their associated suspension bands 64 are similar on each side of the carrier, one side being clearly illustrated in FIGURE 6. The pulleys 42 may be formed of any suitable material, it has however been found particularly advantageous to form them of nylon. Each of the pulleys is provided with a circumferential groove 62 within which the bands 64 are received and guided. It will be particularly noted that a rim portion of each of the pulleys extends into the interior of the vertical slot which forms a guideway 40 in the vertical portions of each of the upright frame members 32 and 34. It will be apparent therefore that the smooth inwardly directed arcuate faces of the beads lining the slot form a smooth guideway or track for the side faces and rim portions of pulleys 42 permitting the smooth vertical movement of the pulleys confined therein. The use of nylon is particularly advantageous since it provides for low frictional contact and smooth, low noise performance. It will now be noted that a suspension band 64 is trained about each pair of pulleys 42 and extends into the guideways 40 forming a loop as it is threaded through the horizontal or bight portions 32c and 34c of the U shaped side frame members 32 and 34 respectively.

The carrier assembly 14 further includes a torque tube assembly designated generally by the numeral 70 and more particularly illustrated in FIGURES 9, 10 and 11. As may be seen from said figures, the torque tube assembly 70 comprises a cylindrical tubular housing 72 each end of which carries a ball bearing 74 which rotatably secures a hollow axle or shaft 76 extends co-axially through said housing. The ends of said hollow shaft 76 extend beyond the extremities of housing 72 as well as the ball bearings 74 disposed therein. Suspension band reels 78 are fixedly secured to outwardly extending free ends of shaft 76 for rotation therewith. Intermediate of said bearings 74 there are provided flanged collars 80 and 82 which are disposed in proximity to said bearings. The reduced body portions of said collars are formed with grooves as indicated at 80a and 82a to fixedly receive and anchor the ends of a coiled torsion spring 84. Collar 82 is secured to shaft 76 for rotation therewith by means of pin 86. The peripheral surface of the flange portion of said collar 82 being spaced from wall of tubular housing 72. Collar 80 on the other hand is fixedly secured by suitable means to the interior wall of housing 72 along the flange portion thereof for rotation therewith. It will be noted that the wall of the bore through collar 80 is spaced from the peripheral surface of shaft 76. The ends of torsion spring 84 are fixedly secured to the collars so that rotation of collar 80 with respect to the axle shaft 76 as by means of the rotation of housing 72, winds said spring and imparts a set or corresponding resistance to opposite rotation which may be exerted on shaft 76. The ends of tubular housing 72 are provided with clamps 88 disposed adjacent the ends thereof and secured to the horizontal flanges 16e and 16f by means of bolts 90. The loosening of bolts 90 permits the tubular housing 72 to be manually grasped and rotated with relation to axle shaft 76 to impart the desired degree of initial bias or set to torsion spring 84. When the desired bias or set bias has been achieved, the tightening of bolts 90 causes the housing to be firmly gripped and to be retained in fixed position against further rotation. An initial bias or set is thus imposed upon the axle shaft 76 which is communicated to the reels and consequently to the entire carrier assembly.

The ends of each of suspension bands 64 are wound about an associated suspension band reel 78. Each of said reels 78 comprises a core 94 having integrally formed axially spaced apart flanges 92 and 92a. The flanges 92 and 92a are each provided with a plurality of bridging screws 96 which are annularly disposed and form a hub cage about which suspension band 64 is wound.

The flanges 92 and 92a of each of reels 78 are provided with registering apertures 98 and 100 for receiving the bridging screws 96. The apertures are annularly spaced about the reel core 94 and are arranged in concentric circles with respect to the axis of the reel. The apertures 98 in outer flanges 92 are dimensioned to permit the passage of the shanks of screws 96 therethrough, while the registering apertures in inner flanges 92a are threaded for engagement with the threaded ends of said screws. It will thus be noted that upon insertion of screws 96 in a circular array of apertures, the shanks of the screws bridge the space between the pairs of flanges and form a cagelike hub of the diameter of the selected circle of apertures. The ends of band 64 are wound about the hub cage thus formed. The diameter of the hub thus formed may be changed by unwinding the band from the reel and repositioning the screws in the circle of apertures of the desired diameter, whereupon the band is rewound thereon. Varying the diameter of the reel hub in this matter permits the position of the band 64 to be varied with respect to the center of the reel. The moment arm of the band with respect to the axis of the reel may thus be set at for any desired length. The setting of the lever or moment may be accomplished in increments depending upon the radial distance between the circles of apertures. Although the apertures may if desired, be disposed in straight line radially spaced relation, it has been found advantageous to displace the apertures of each radial group in the form of a swirl or volute pattern. This offset arrangement of the apertures permits a greater number of apertures to be provided for a given radial distance from the axis of the reel and thus permits the hub cage diameter to be varied in smaller increments.

As heretofore indicated, each of the side frame members is provided with a suspension band 64 which may advantageously be comprised of flexible ribbons of stainless steel or the like. The bands 64 are each looped through the interior of the bight or horizontal portions of the U shaped side frame members 32 and 34 respectively and extend downwardly through the vertical portions and the ends are then trained about the pulleys 42. The bands 64 are of sufficient length to permit the carrier assembly to reach the lowermost point of its descent to a point adjacent the base frame while end portions of the bands still remain wound about the hub cage and their extremities are clamped to the core 94 of each of reels as shown in FIGURE 7. As may be seen from said figure, the axle shaft 76 and cores 94 of the reels 78 are each provided with diametrically extending registering openings 104 and 106. The extremities of end portions 64a and 64b of the band 64 are assembled with a short outer layer of strip material 102 and the three layers of band material are folded over and inserted within the diametrically extended openings 104 and 106, being anchored in position by means of pin 108. Shaft 76 is thus simultaneously keyed to the reels 78 for rotation therewith. The ends 64a and 64b of the bands are trained about the reel from diametrically opposed directions so that both ends of the band are simultaneously wound about each reel when the reel is rotated in the direction indicated by the "wind" arrow causing the carrier to ascend, rotation of the reel in the direction indicated by the "unwind" arrow causes the unwinding of the bands and accompanies the descent of the carrier assembly. The outer layer of strip material 102 forms an initial circumferential layer about the screws 96 and thus forms a relatively smooth drum surface for the suspension bands, preventing damage and reducing wear on the bands. The strip 102 is advantageously formed of tempered spring steel.

The upper ends of the guideways 40 are each provided with a stop block 110, secured in position as by welding. A clearance space is provided between each stop block and the rear wall of the guideway within which it is disposed as is clearly shown at 112 in FIGURE 8. The band 64 passes through this space. Each stop block 110 is provided with a threaded aperture within which a clamping screw 114 is secured. It will be apparent that when screw 114 is advanced, it will serve to clamp the portion of the band 64 disposed in the clearance space 112 against the back wall of the guideway. The stop blocks also determine the limit of upward travel of the carrier assembly 14 as a result of the abutment of the outwardly projecting ends 44a and 46a of the channel members 44 and 46a therewith.

It will be apparent from the foregoing that there has thus been provided an arrangement wherein a carrier assembly for receiving stacked articles and maintaining the uppermost article of the stack at a predetermined level. The carrier assembly 14 is suspended within a rectangular well defined in an upright frame assembly 12 which is in turn supported on a wheel mounted base 10. The suspension means comprises a pair of cables or bands 64 which are looped about the upper portion of the supporting upright frame assembly; the ends of each band being wound about its associated reel 78 in diametrically opposed relation so that rotation of the reels in one direction as by the removal of a load from the carrier serves to wind the bands about the reels and elevates the carrier assembly while the imposition of additional load on the carrier causes rotation of said reels in the opposing direction and causes the bands to be unwound from the reels simultaneously with the descent of the carrier and the stack of articles disposed thereon as may be seen in FIGURES 12 and 13. The carrier assembly includes a torque tube assembly 70 including a torsion coil spring 84 which serves to provide a biasing force for the reels in order to maintain the carrier assembly in elevated position under no load conditions and controls its ascent and descent under varying loads. As a load is placed upon the carrier assembly it is caused to descend a distance determined by the degree of resistance of the coil spring to further tensioning. The amount of deflection of the coil spring under any given band will depend upon the lever or moment arm of the suspension bands with respect to the axis of the reels. This moment arm is determined by the radius of the circular hub cage formed on the reels by means of a circular array of bridging screws provided. This moment arm may be set to any desired radius so that the degree of deflection and consequent vertical movement of the carrier for any given weight may be controlled. In this manner it is possible to adjust the distance that the carrier platform will drop as each article is added to the stack. The carrier may therefore be readily adapted for accommodating groups of articles such as dish racks or the like of various heights, the height and weight of the members of the group being uniform, while maintaining the uppermost article on the stack at a uniform predetermined level. When the stack is to be composed of racks of a different weight or height, the vertical travel of the carrier for each increment of weight may be adjusted by appropriate initial setting of the coil spring of the torque tube assembly in conjunction with the positioning of the moment arm of the bands with respect to the axis of each band reel.

The initial adjustment of the device may be accomplished in the following manner: The torque tube clamps 88 are released by loosening of screws 90. This permits the housing 72 and axle shaft 76 to rotate freely and consequently releases all tension upon coil spring 84. The suspension band reels 78 are thus permitted to rotate, unwinding the suspension bands 64 as the entire carrier assembly 14 bottoms adjacent the base assembly 10. At this point, any remaining tape may be unwound from the reels until the bridging screws 96 are exposed. It is preferred that the bands be held so that the series of aperture guide numerals and locking pin 108 as shown in FIGURES 6 and 7 are in a vertical position. The locking pin is retained against withdrawal by screw 109. The screws 96 may now be removed and replaced in a circular or annular array depending upon the particular moment arm desired. The numerals 3, 4, 5, 6, 8 and 10 shown in FIGURE 6 on the flange 92 of reel 78 may advantageously be used as calibration guides. Thus for example, the numerals may indicate that the use of apertures in the circular array thus identified will result in one inch of deflection of the carrier platform for each three pounds of weight imposed thereon. Other indicia may be used for indicating the weight to deflection ratios for any preset tension on the coil spring.

With the desired circular array of bridging screws in position the manual rotation of housing will cause the bands to be wound about the reels until all of the slack is taken up, care being taken that strip 102 forms the initial layer about the hub cage defined by the bridging screws. Continued manual rotation of the housing in the move up or wind directions indicated in FIGURES 6 and 7 will cause the carrier assembly to rise with some initial tensioning of the coil springs. When the carrier assembly reaches the upper limit of its movement as determined by abutment with the stop blocks 110, further manual rotation of housing of the torque tube assembly significantly tensions the coil spring since the suspension bands prevent further rotation of the reels and axle shaft. When the coil spring has been set to the desired tension or bias, the clamps may be locked by tightening the screws. It should be noted that the tangential offset of the arms of the clamps forms a clamping loop which tends to assist in preventing the counter rotation of the housing.

The arrangement further permits the carrier assembly to be readily adjusted to a level condition whenever such adjustment is desired. The leveling adjustment is accomplished in the following manner. With the carrier in unloaded condition and disposed at the top of its travel in the upright frame, the clamping screws 114 in the four stop blocks 110 are retracted. This action frees each of the suspension bands for movement. The torque tube assembly clamps 88 are then opened by loosening the screws while the torque tube assembly housing is manually held against rotation. As heretofore indicated, the clamps provide some assistance in resisting counter rotation. The housing is then manually rotated in the direction of the move up arrow in FIGURE 6 until the suspension bands are equalized and the projecting ends 44a and 46a of the U shaped channel members 44 and 46 respectively are firmly butted up against each of the four stop blocks, as indicated in FIGURES 1, 4, 5 and 6. With the four corners of the carrier assembly thus accurately located, the carrier is in level condition.

The embodiment of the invention illustrated and described hereinabove has been selected for the purpose of clearly setting forth the principles involved. It will be apparent, however, that the present invention is susceptible to being modified in respect to details of construction, combination and arrangement of parts which may be resorted to without departure from the spirit and scope of the invention as claimed.

I claim:

1. A self-leveling device comprising a carrier assembly including a platform for supporting a plurality of articles in stacked relation means for supporting said carrier assembly for vertical movement, said means comprising a pair of suspension bands and reel means for each of said bands about which portions of said bands are wound as said carrier moves, said reel means each comprising a pair of spaced apart flange members provided with means which define a variable diameter hub about which the band is wound.

2. The device according to claim 1 wherein said variable hub comprises axially aligned apertures arranged in circular arrays of differing diameters in said flange members, and removable bridging elements extending between aligned apertures arranged in a circular array, said bridging elements being provided with screw threads for engagement with complementary screw threaded apertures provided in one of said flanges.

3. The device according to claim 1 wherein said variable hub comprises axially aligned apertures arranged in circular arrays of differing diameters in said flange members, and removable bridging elements extending between aligned apertures arranged in a circular array, the apertures provided in each flange being arranged in a swirl pattern.

4. A self-leveling device comprising in combination a wheel mounted base assembly, an upright frame assembly supported by said base assembly, said upright frame assembly being comprised of a pair of tubular side frame members of U shaped configuration each of said frame members having a pair of vertically disposed leg portions connected by means of a horizontal bight portion and being transversely braced, thereby defining a well above said base, a carrier assembly suspended within said well for vertical movement in accordance with the weight of articles disposed thereon, the suspension means for said carrier comprising a pair of suspension bands each of said bands being looped through the bight portion of said upright frames and extending into the leg portions thereof, said carrier assembly including torque tube means including a torsion spring for biasing said carrier to elevated position, said torque tube means including a pair of spaced apart reels for receiving portions of the ends of said bands wound thereabout and being operatively connected with said spring, said reels including means for varying the lever arms presented by the winding hub portions of said reels to the axes thereof.

5. A self-leveling device comprising in combination a wheel mounted base assembly, an upright frame assembly supported by said base assembly, said upright frame assembly defining a well above said base, a carrier assembly suspended within said well for vertical movement in accordance with the weight of articles disposed thereon, the suspension means for said carrier assembly comprising a pair of suspension bands looped about portions of said upright frame, said carrier assembly including a torsion spring for biasing said carrier assembly to elevated position, said torque tube means including a pair of spaced apart reels having winding hub portions, each of said reels having the end portions of a band wound thereabout and being operatively connected with said spring, said reels including variable diameter hub means for varying the lever arms presented by the winding hub portions of said reels to the axes thereof.

6. A self-leveling device comprising a carrier assembly including a platform for supporting a plurality of articles in stacked relation means for suspending said carrier assembly for vertical movement, said means comprising a pair of suspension bands each of said bands looped about portions of said support, the end portions of each of said bands being wound about reel means mounted upon said carrier, said reel means each comprising a pair of spaced apart flange members provided with registering apertures arranged in circular arrays of differing diameter, removable bridging elements extending between pairs of registering apertures comprising one of said circular arrays and defining a variable diameter hub cage about which a band is wound, said reel means being spring biased for urging said reels toward a wound condition for elevating said carrier.

7. A self-leveling device adapted to support a plurality of articles in stacked relation and to maintain the uppermost article on the stack at a predetermined level, said device comprising a support, a carrier assembly suspended from said support, said carrier assembly including a platform for the support of the articles, said suspension means comprising a pair of suspension bands disposed along opposite sides of said platform, the ends of said bands being wound about reel means affixed to a shaft rotatably supported by said carrier, said shaft being biased by a torsion spring disposed thereon and being provided with means for imparting an initial bias thereto, each of said reel means being provided with means for selectively varying the leverage exerted by said bands upon said spring, said means comprising a pair of spaced apart flanges secured to each other and provided with registering apertures in circular arrays of differing diameter, bridging means disposed in the apertures of one of said circular arrays defining a squirrel cage hub about which portions of said bands are wound and presenting a lever arm extending radially between the axis of each reel and the portions of the band wound about the hub thus defined.

8. A self-leveling device comprising in combination a wheel mounted base assembly, an upright frame assembly supported by said base assembly, said upright frame assembly defining a well and comprising a pair of spaced apart tubular side frame members of generally U shaped configuration, each of said frame members having a pair of vertically disposed leg portions connected by a horizontal bight portion, the leg portions of each of said frame members being provided with longitudinally extending guideways disposed in confronting relation, a carrier assembly suspended within the well defined by said upright frame member, said carrier assembly including pairs of idler pulleys disposed adjacent the extremities of the sides thereof, the rim portions of said pulleys extending into said guideways, whereby said carrier assembly may be moved vertically within said well under the guidance of said pulleys, and suspension band means secured to said frame members and connected to said carrier assembly for suspending said carrier assembly within the well, said suspension bands being looped through said bight portions, extending into said leg portions and emerging therefrom through said guideways and being trained about said pulleys.

9. The device according to claim 8 wherein spring biased reel means are provided for securing the ends of said bands and winding them thereon.

10. The device according to claim 8 wherein clamping means are provided adjacent the upper end of each guideway for clamping the looped portions of said bands against movement.

11. A self-leveling device comprising in combination a wheel mounted base assembly, an upright frame assembly supported by said base assembly, said upright frame assembly defining a well and comprising a pair of spaced apart tubular side frame members of generally U shaped configuration, each of said frame members having a pair of vertically disposed leg portions connected by a horizontal bight portion, the leg portions of each of said frame members being provided with longitudinally extending guideways disposed in confronting relation, a carrier assembly suspended within the well defined by said upright frame member, said carrier assembly including pairs of idler pulleys disposed adjacent the extremities of the sides thereof, the rim portions of said pulleys extending into said guideways whereby said carrier assembly may be moved vertically within said well under the guidance of said pulleys, suspension band means looped through each of said bight portions, the ends of each of said suspension bands extending into said guideways and being trained about said pulleys, reel means disposed intermediate the member comprising each pair of pulleys, the ends of said bands being anchored to said reel means and wound thereabout from diametrically opposed points, whereby the simultaneous revolution of said reels will cause said bands to be wound thereon or unwound therefrom, causing said carrier assembly to rise or descend.

12. A self-leveling device comprising a carrier assembly including a platform for supporting a plurality of articles in stacked relation, means for supporting said carrier assembly for vertical movement, said means comprising a pair of suspension bands and reel means for each of said bands about which portions of said bands are wound as said carrier moves, said reel means each comprising a pair of spaced apart flange members and being provided with axially aligned apertures arranged in circular arrays of differing diameter, bridging elements extending between aligned apertures arranged in a circular array defining a hub cage about which the band is wound, said bridging elements being removable whereby they may be removed from a circular array of one diameter and replaced in an array of another diameter as desired.

References Cited by the Examiner

UNITED STATES PATENTS

| | | | |
|---|---|---|---|
| 744,613 | 11/1903 | Reimond | 108—147 |
| 2,560,928 | 7/1951 | Bockius | 108—136 |
| 2,775,352 | 12/1956 | Waite | 108—136 X |
| 2,802,575 | 8/1957 | Harrison | 108—136 X |
| 3,123,023 | 3/1964 | Bronson | 108—136 |
| 3,123,024 | 3/1964 | Bronson | 108—136 |
| 3,123,829 | 3/1964 | Bronson | 108—136 |
| 3,154,029 | 10/1964 | Bronson | 108—136 |

FRANK B. SHERRY, *Primary Examiner.*

CASMIR A. NUNBERG, *Examiner.*

G. O. FINCH, *Assistant Examiner.*